United States Patent
Lee

(10) Patent No.: US 10,157,382 B2
(45) Date of Patent: Dec. 18, 2018

(54) SECURE PAYMENT DEVICE

(71) Applicant: WOOSIM SYSTEM INC., Seoul (KR)

(72) Inventor: Il Bok Lee, Gyeonggi-do (KR)

(73) Assignee: WOOSIM SYSTEM INC., Seoul (KR)

( * ) Notice: Subject to any disclaimer, the term of this patent is extended or adjusted under 35 U.S.C. 154(b) by 373 days.

(21) Appl. No.: 15/027,247

(22) PCT Filed: Aug. 21, 2014

(86) PCT No.: PCT/KR2014/007751
§ 371 (c)(1),
(2) Date: Apr. 4, 2016

(87) PCT Pub. No.: WO2015/053474
PCT Pub. Date: Apr. 16, 2015

(65) Prior Publication Data
US 2016/0253668 A1    Sep. 1, 2016

(30) Foreign Application Priority Data

Oct. 7, 2013  (KR) .................... 10-2013-0118973

(51) Int. Cl.
*G06Q 40/00*    (2012.01)
*G06Q 20/40*    (2012.01)
(Continued)

(52) U.S. Cl.
CPC ....... *G06Q 20/4012* (2013.01); *G06Q 20/322* (2013.01); *G06Q 20/3278* (2013.01);
(Continued)

(58) Field of Classification Search
CPC .... G07F 19/20; G07F 19/201; G06Q 20/1085
(Continued)

(56) References Cited

U.S. PATENT DOCUMENTS

| 2012/0290420 A1* | 11/2012 | Close | G06Q 20/20 |
| | | | 705/17 |
| 2017/0124549 A1* | 5/2017 | Jeon | G06F 3/0482 |
| 2017/0293909 A1* | 10/2017 | Song | G06Q 20/405 |

FOREIGN PATENT DOCUMENTS

| JP | 2003-099853 A | 4/2003 |
| KR | 10-2003-0016059 A | 2/2003 |

(Continued)

OTHER PUBLICATIONS

Korean Patent Abstract (in English) of KR Pub. No. 10-2003-0016059 A, Pub. Date Feb. 26, 2003, downloaded Sep. 27, 2016 from http://kpa.kipris.or.kr/kpa/.

(Continued)

*Primary Examiner* — Ahshik Kim
(74) *Attorney, Agent, or Firm* — Barcelo, Harrison & Walker, LLP

(57) ABSTRACT

Provided is a secure payment device. The secure payment device includes: a payment terminal on which a pin-pad including a keypad module is mounted and which is capable of communicating with a mobile terminal via a short-range communication; a mobile terminal accommodation unit coupled to one surface of the payment terminal to detachably couple the mobile terminal to the payment terminal; and a mounting unit screw-fastened to one surface of the payment terminal and including at least one fixing protrusion configured to slide into and be fixed at a fixing groove formed on one side surface of the mobile terminal accommodation unit, wherein the payment terminal includes at least one flexible protrusion configured to slide into and be fixed at a fixing groove formed on the other side surface of the mobile terminal accommodation unit. The secure payment device is detachably coupled to the mobile terminal having any one of various shapes to enhance security during requesting or approving payment using a card, such as a (Continued)

credit card or a debit card, or payment of other electronic transactions while providing convenience in use.

4 Claims, 5 Drawing Sheets

(51) Int. Cl.
    *G06Q 20/32*           (2012.01)
    *G07F 7/08*            (2006.01)

(52) U.S. Cl.
    CPC .......... *G07F 7/0873* (2013.01); *G07F 7/0886* (2013.01); *G07F 7/0893* (2013.01)

(58) Field of Classification Search
    USPC .................................................. 235/379, 383
    See application file for complete search history.

(56) References Cited

FOREIGN PATENT DOCUMENTS

| KR | 10-2004-0041466 A | 5/2004 |
|---|---|---|
| KR | 10-2004-0106998 A | 12/2004 |
| KR | 10-2006-0039311 A | 5/2006 |
| KR | 10-2008-0056329 A | 6/2008 |
| KR | 10-2009-0118390 A | 11/2009 |

OTHER PUBLICATIONS

Japanese Patent Abstract (in English) of JP Pub. No. 2003-099853 A, Pub. Date Apr. 4, 2003, downloaded Jun. 29, 2016 from http://www4.j-platpat.inpit.go.jp/eng/.

Korean Patent Abstract (in English) of KR Pub. No. 10-2004-0041466 A, Pub. Date May 17, 2004, downloaded Jun. 29, 2016 from http://kpa.kipris.or.kr/kpa/.

Korean Patent Abstract (in English) of KR Pub. No. 10-2004-0106998 A, Pub. Date Dec. 20, 2004, downloaded Sep. 27, 2016 from http://kpa.kipris.or.kr/kpa/.

Korean Patent Abstract (in English) of KR Pub. No. 10-2006-0039311 A, Pub. Date May 8, 2006, downloaded Jun. 29, 2016 from http://kpa.kipris.or.kr/kpa/.

Korean Patent Abstract (in English) of KR Pub. No. 10-2008-0056329 A, Pub. Date Jun. 23, 2008, downloaded Jun. 29, 2016 from http://kpa.kipris.or.kr/kpa/.

Korean Patent Abstract (in English) of KR Pub. No. 10-2009-0118390 A, Pub. Date Nov. 18, 2009, downloaded Sep. 27, 2016 from http://kpa.kipris.or.kr/kpa/.

* cited by examiner

SECURE PAYMENT DEVICE

CROSS-REFERENCE TO RELATED APPLICATIONS

This application is the national stage for International Patent Cooperation Treaty Application PCT/KR2014/007751, filed Aug. 21, 2014, which claims priority from Korean Patent Application No. 10-2013-0118973, filed on Oct. 7, 2013, in the Korean Intellectual Property Office. The entire contents of said applications are incorporated herein by reference for all purposes.

BACKGROUND

Technical Field

The present invention relates to a secure payment device, and more particularly, to a secure payment device detachably coupled to a mobile terminal having any shape.

Background Art

A secure payment device includes a pin-pad and is used to request or approve payment using cards, such as credit cards and debit cards, and payment of other electronic transactions.

Generally, the pin-pad is a device for a customer to directly input a password instead of writing the password on a paper, in order to prevent the password written on an application for opening an account, a slip, or the like from leaking while an employee of a finance company is working or discarding the slip. The pin-pad is mostly used as a password input device provided in business branches of a finance company, and as the customer directly inputs a password The pin-pad may be provided in an automatic teller machine (ATM) or a portable device, and when a user inputs a password, encrypts and processes the password.

The pin-pad included in the secure payment device may be used to input payment information, such as a password, when security is required, and is coupled to an encryption device for encrypting input data.

The secure payment device is communicably connected to a mobile terminal, such as a smart phone, whereby payment information input through the secure payment device may be encrypted, a payment server is requested for payment through the mobile terminal, and payment approval information is received from the payment server.

However, when the secure payment device and the mobile terminal are used while being separated from each other or are configured to communicate with each other via a wired connection, it may be inconvenient to use or carry the secure payment device.

Accordingly, the secure payment device and the mobile terminal may be configured to be detachably coupled to each other, and to communicate with each other wirelessly. Also, since a size and an external shape of the mobile terminal may vary according to products, the secure payment device may be configured to be detachable to the mobile terminal having any one of various shapes.

Technical Problem

One or more embodiments of the present invention provide a secure payment device that is detachably coupled to a mobile terminal having any shape and is capable of communicating with the mobile terminal via a short-range communication.

Technical Solution

According to an aspect of the present invention, there is provided a secure payment device including: a payment terminal on which a pin-pad including a keypad module is mounted and which is capable of communicating with a mobile terminal via a short-range communication; a terminal accommodation unit coupled to one surface of the payment terminal to detachably couple the mobile terminal to the payment terminal; and a terminal mounting unit screw-fastened to one surface of the payment terminal and including at least one fixing protrusion configured to slide into and be fixed at a fixing groove formed on one side surface of the terminal accommodation unit, wherein the payment terminal includes at least one flexible protrusion configured to slide into and be fixed at a fixing groove formed on the other side surface of the terminal accommodation unit.

The mobile terminal may be configured to transmit payment information received from the payment terminal to a payment server through a communication network, and transmit authentication information received from the payment server as the payment information is authenticated to the payment terminal, and the terminal accommodation unit may be configured to be changeable according to a type of the mobile terminal.

The terminal accommodation unit may be attachable to and detachable from the payment terminal, and a location of the at least one fixing protrusion may vary according to a type of the mobile terminal and a type of the terminal accommodation unit.

Advantageous Effects

According to the present invention, a secure payment device is configured to be detachable to a mobile terminal having any shape by changing a terminal accommodation unit according to a type of the mobile terminal, and is capable of requesting and approving payment with the mobile terminal via a short-range communication. Accordingly, security may be enhanced while requesting and approving payment using a card, such as a credit card or a debit card, or payment of other electronic transactions, while providing convenience in use.

DETAILED DESCRIPTION

Best Mode

Hereinafter, one or more embodiments of the present invention will now be described with Hereinafter, one or more embodiments of the present invention will now be described with reference to accompanying drawings.

Figure 1:
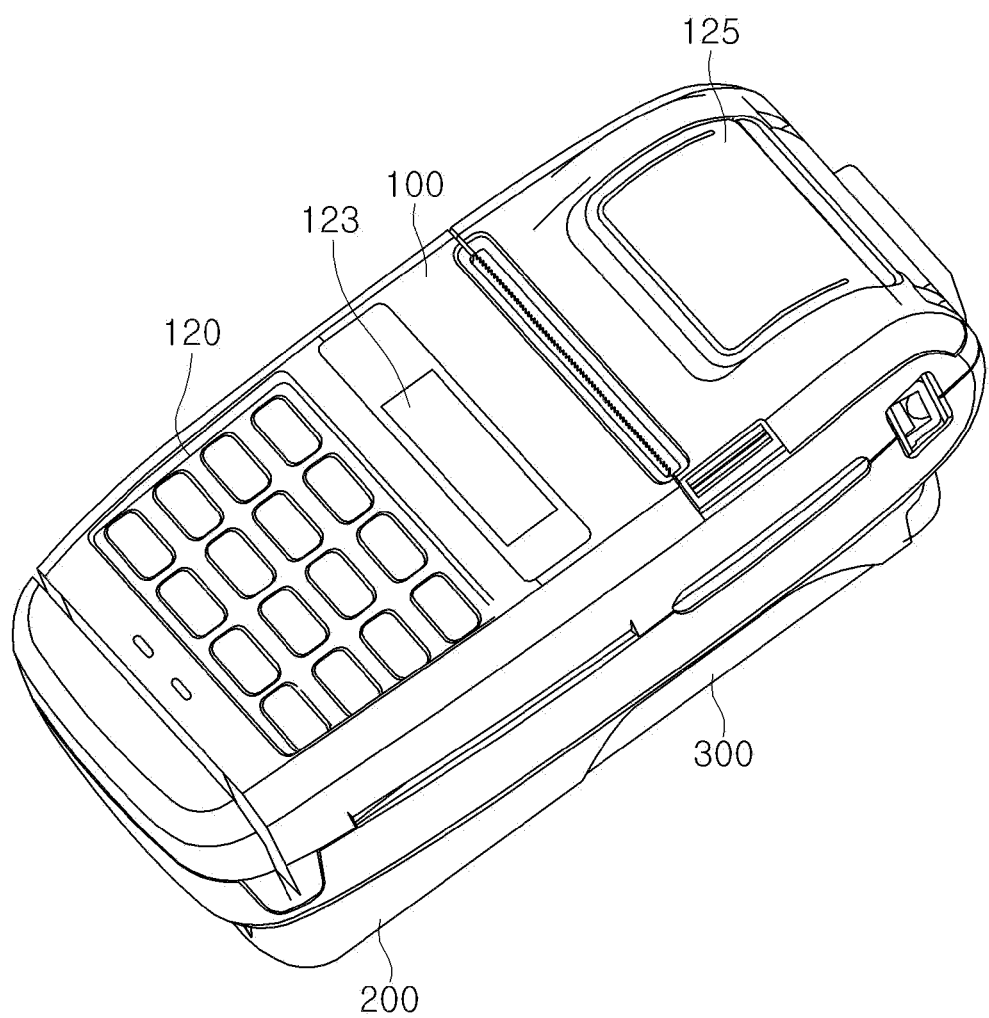
FIGS. 1 and 2 are views for describing an external shape of a secure payment device, according to an embodiment of the present invention.
Figure 2:
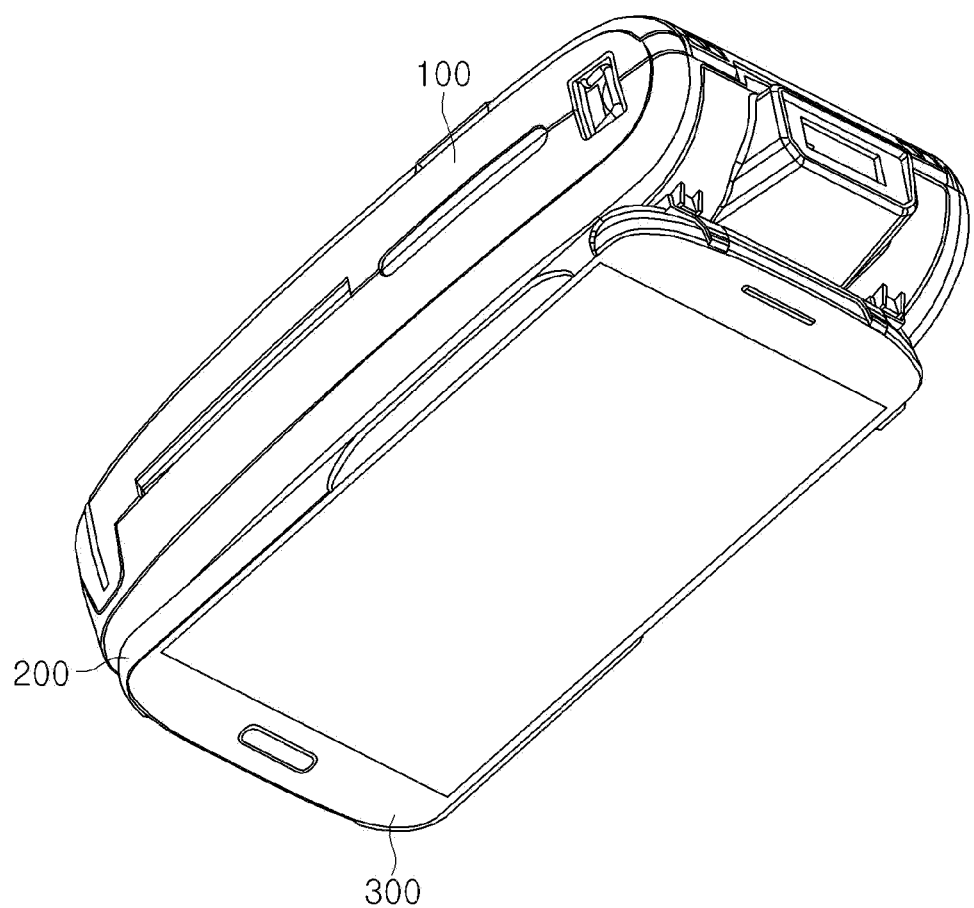

FIGS. 1 and 2 are views for describing an external shape of a secure payment device, according to an embodiment of the present invention.

Referring to FIGS. 1 and 2, the secure payment device includes a payment terminal 100 on which a pin-pad including a keypad module is mounted, and a terminal accommodation unit 200 coupled to one surface of the payment terminal 100 to detachably couple a mobile terminal 300 to the payment terminal 100.

The payment terminal 100 may include a keypad module 120 including a plurality of buttons for inputting a number or a sign, a display unit 123 displaying information processed by the payment terminal 100, and a print unit 125 printing a card statement or a receipt.

The payment terminal 100 and the mobile terminal 300 may be communicably connected to each other via a short-range communication. Accordingly, the mobile terminal 300 may transmit payment information received from the payment terminal 100 to a payment server through a communication network, and transmit authentication information received from the payment server as the payment information is authenticated to the payment terminal 100.

Figure 3:
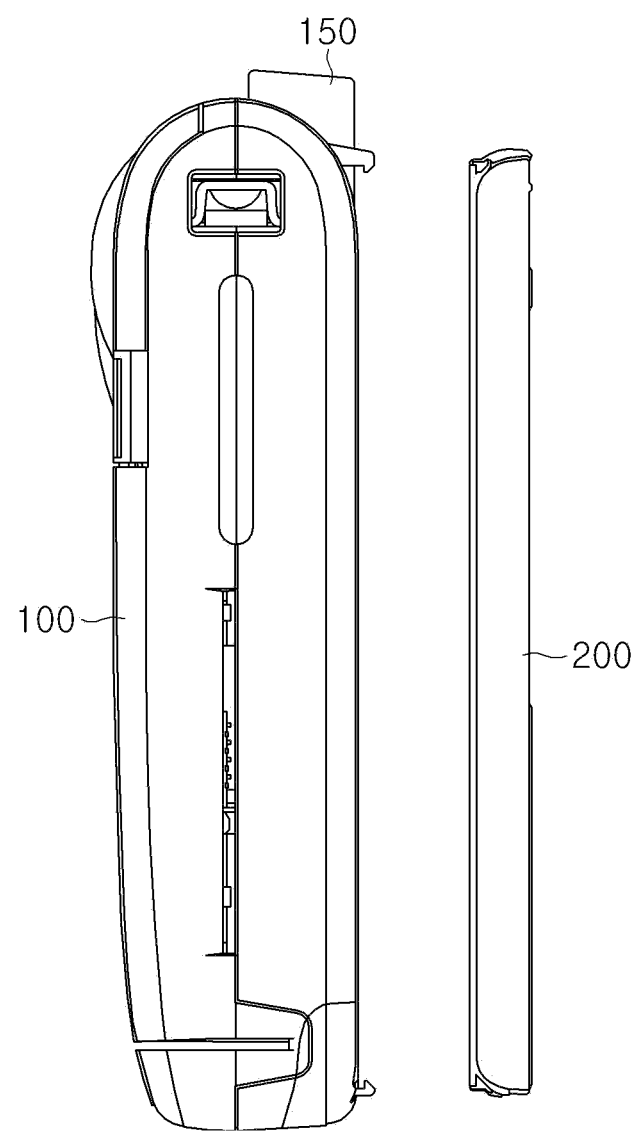
FIG. 3 is a view of a payment terminal and a terminal accommodation unit, which are separated from each other.
Figure 4:
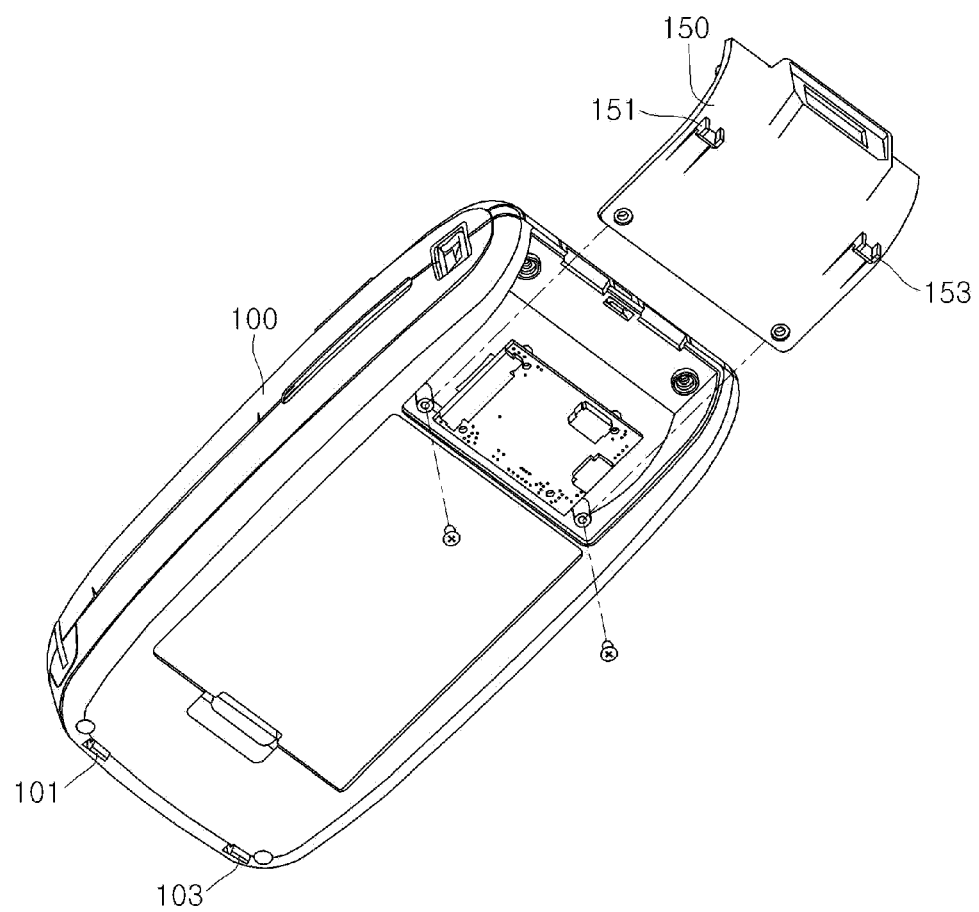
FIG. 4 is a view of the payment terminal and a terminal mounting unit, which are separated from each other.

FIG. 3 is a view of the payment terminal 100 and the terminal accommodation unit 200, which are separated from each other, and FIG. 4 is a view of the payment terminal 100 and a terminal mounting unit 150, which are separated from each other.

As shown in FIG. 3, the terminal accommodation unit 200 is configured to be attachable to and detachable from the payment terminal 100, and accommodates the mobile terminal 300. The mobile terminal 300 may be detachably coupled to the payment terminal 100 by the terminal accommodation unit 200.

The terminal accommodation unit 200 may be changed according to a type of the mobile terminal 300. In other words, when a size or an external shape of the mobile terminal 300 changes according the type of the mobile terminal 300, the terminal accommodation unit 200 may be changed accordingly.

Referring to FIG. 4, the terminal mounting unit 150 may be coupled to one surface of the payment terminal 100 by using a screw, or the like. The terminal mounting unit 150 includes fixing protrusions 151 and 153 that slide into and are fixed at a fixing groove formed on one side surface of the terminal accommodation unit 200.

The terminal mounting unit 150 may also be changed to a suitable shape according to changing of the terminal accommodation unit 200 to be mounted on the payment terminal 100. In other words, locations of the fixing protrusions 151 and 153 provided in the terminal mounting unit 150 may vary according to a type of the mobile terminal 300 or a type of the terminal accommodation unit 200.

Meanwhile, the payment terminal 100 includes flexible (or movable) protrusions 101 and 103 that slide into and are fixed at a fixing groove formed on the other side surface of the terminal accommodation unit 200. The terminal accommodation unit 200 is detachably coupled to the payment terminal 100 by using the flexible protrusions 101 and 103 formed on the payment terminal and the fixing protrusions 151 and 153 formed on the terminal mounting unit 150. At this time, a complementary member having a shape of T or another shape may be provided around the fixing groove of the terminal accommodation unit 200 to prevent the fixing groove from being damaged.

Figure 5:
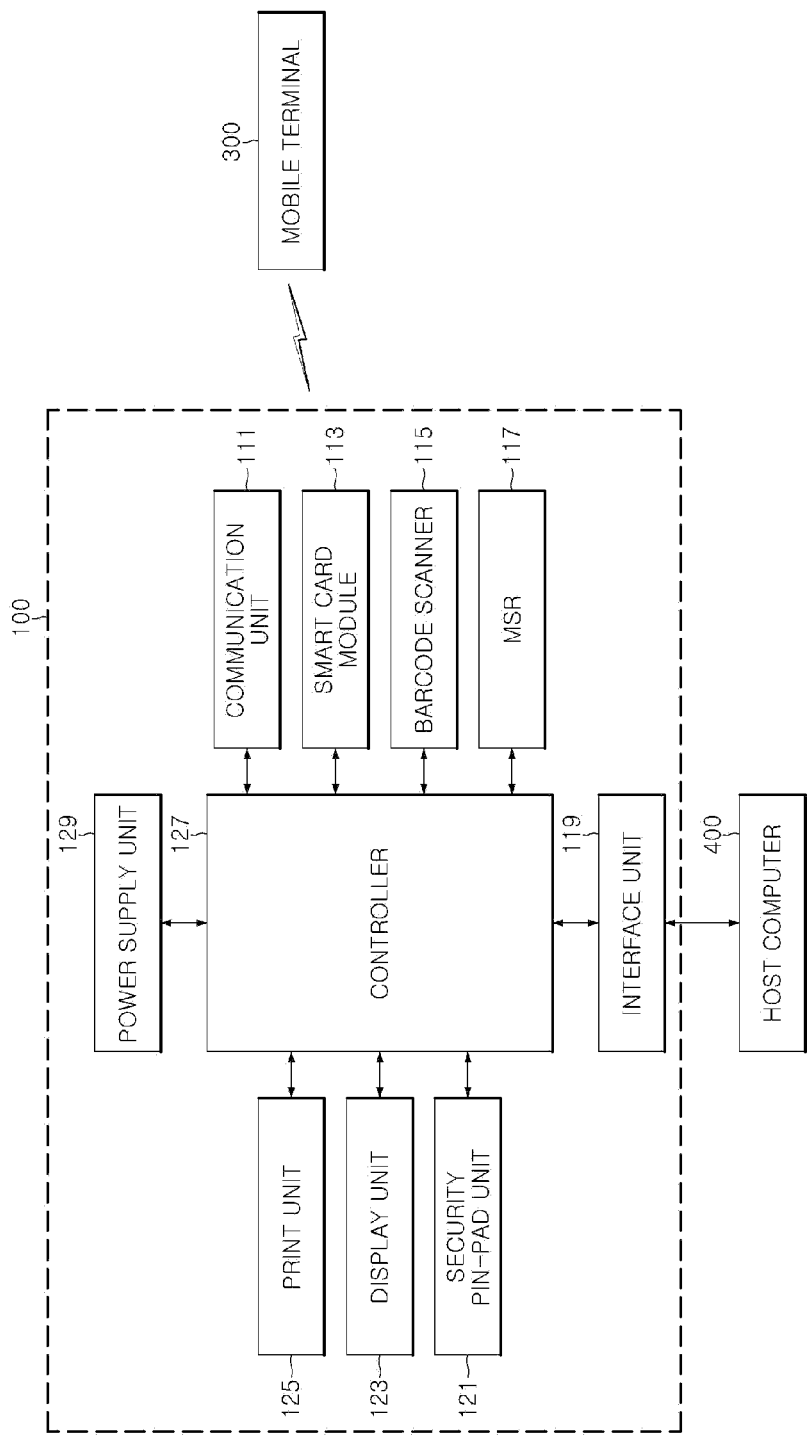
FIG. 5 is a block diagram of the payment terminal of FIG. 1.

FIG. 5 is a block diagram of the payment terminal 100 of FIG. 1.

Referring to FIG. 5, the payment terminal 100 may include a communication unit 111, a smart card module 113, a barcode scanner 115, a magnetic stripe reader (MSR) 117, an interface unit 121, the display unit 123, the print unit 125, a controller 127, and a power supply unit 129.

When such components are embodied in an actual application, at least two components may be combined as one component or one component may be divided into at least two components.

The communication unit 111 provides a communication interface for a short-range communication with the mobile terminal 300. Examples of the short-range communication include Bluetooth, radio frequency identification (RFID), infrared data association (IrDA), ultra wideband (UWB), and Zigbee.

The smart card module 113 provides a function for approving payment and use of a smart card. The barcode scanner 115 provides a function of capturing and recognizing a barcode or a quick response (QR) code. The MSR 117 provides a function for approving payment and use of a magnetic card.

The interface unit 119 performs an interface function with all external devices connected to the payment terminal 100. The payment terminal 100 may be communicably connected to a host computer 400 through the interface unit 119 to transmit and receive data.

The security pin-pad unit 121 includes a pin-pad, and encrypts and processes input payment information, or the like. The display unit 123 displays information processed by the payment terminal 100. At least two display units 123 may exist according to an embodiment of the secure payment device. During card payment, the print unit 125 may print a card statement or a receipt.

The controller 27 generally controls operations of each component, and controls overall operations of the payment terminal 100. Also, the power supply unit 129 supplies power required to operate each component under control of the controller 127.

Accordingly, the mobile terminal 300 communicably connected to the payment terminal 100 may transmit payment information received from the payment terminal 100 to the payment server through the communication network. Also, the mobile terminal 300 may transmit the authentication information received from the payment server as the payment information is authenticated by the payment server to the payment terminal 100.

Also, the secure payment device according to the present invention is not limitedly applied to structures of the embodiments described above, but all or some of the embodiments may be selectively combined for various modifications.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention may be used in a secure payment device for requesting or approving payment using a card, such as a credit card or a debit card, or payment of other electronic transactions.

What is claimed is:

1. A secure payment device comprising:
a payment terminal on which a pin-pad comprising a keypad module is mounted and which is capable of communicating with a mobile terminal via a short-range communication;

a terminal accommodation unit coupled to one surface of the payment terminal to detachably couple the mobile terminal to the payment terminal; and a terminal mounting unit screw-fastened to one surface of the payment terminal and comprising at least two fixing protrusions configured to slide into and be fixed at a fixing groove formed on one side surface of the terminal accommodation unit, wherein the payment terminal comprises at least two flexible protrusions configured to slide into and be fixed at a fixing groove formed on the other side surface of the terminal accommodation unit.

2. The secure payment device of claim 1, wherein the mobile terminal is configured to transmit payment information received from the payment terminal to a payment server through a communication network, and transmit authentication information received from the payment server as the payment information is authenticated to the payment terminal.

3. The secure payment device of claim 1, wherein the terminal accommodation unit is configured to be changeable according to a type of the mobile terminal, and a complementary member having a shape of a bracket is provided around the fixing groove to prevent the fixing groove from being damaged.

4. The secure payment device of claim 1, wherein the terminal accommodation unit is attachable to and detachable from the payment terminal, and the locations of the at least two fixing protrusions vary according to a type of the mobile terminal and a type of the terminal accommodation unit.

* * * * *